United States Patent [19]

Bennett et al.

[11] Patent Number: 4,815,918
[45] Date of Patent: Mar. 28, 1989

[54] VEHICLE RESTRAINT HAVING A SNUBBING RESTRAINING MEMBER

[75] Inventors: Mark A. Bennett, Milwaukee; Douglas H. Massey, New Berlin, both of Wis.

[73] Assignee: Kelley Company, Inc., Milwaukee, Wis.

[21] Appl. No.: 87,830

[22] Filed: Aug. 21, 1987

[51] Int. Cl.⁴ ............................................. B65G 69/00
[52] U.S. Cl. ..................................... 414/401; 414/584
[58] Field of Search ................ 414/401, 396, 584, 98, 414/99, 118, 673, 540; 14/71.1; 187/22, 9 R; 271/160

[56] References Cited

U.S. PATENT DOCUMENTS

| 1,231,380 | 6/1917 | Kissane et al. | 414/673 X |
| 2,693,284 | 11/1954 | Gerhardt | 214/38 |
| 4,127,856 | 11/1978 | Bickel | 340/687 |
| 4,148,498 | 4/1979 | Taylor, Jr. | 280/482 |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,540,329 | 9/1985 | Martin | 414/540 X |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1986 | Hahn | 414/401 |
| 4,630,989 | 12/1986 | Davey | 414/401 |
| 4,634,334 | 1/1987 | Hahn et al. | 414/401 |
| 4,695,216 | 9/1987 | Erlandsson | 414/401 |

FOREIGN PATENT DOCUMENTS 1259073 1/1968 Fed. Rep. of Germany .......... 187/9

Primary Examiner—Robert J. Spar
Assistant Examiner—Gary Cundiff
Attorney, Agent, or Firm—Andrus, Sceales, Starke & Sawall

[57] ABSTRACT

A vehicle restraint to be mounted on a loading dock for preventing accidental movement of a vehicle, such as a truck, from the dock during a loading operation. A hydraulic cylinder unit is connected through a flexible member, such as a chain, to a hook-like restraining member. By extending and retracting the hydraulic cylinder unit, the restraining member can be moved between the lower storage position and an upper operative position where it engages the ICC bar of the truck. In addition, a resilient member, such as a gas spring, is operably connected to the chain at a location between the attachment of the hydraulic cylinder to the chain and the attachment of the chain to the restraining member. The resilient nature of the gas spring will permit limited movement of the chain to accommodate vertical float of the ICC bar and truck bed during a loading operation. The restraining member includes an outer section or tip that can be moved inwardly toward the dock by a separate fluid cylinder to snub the tip against the ICC bar to prevent fore and aft rocking of the truck during the loading operation.

18 Claims, 3 Drawing Sheets

VEHICLE RESTRAINT HAVING A SNUBBING RESTRAINING MEMBER

BACKGROUND OF THE INVENTION

Vehicle restraints are commonly used in association with a loading dock to prevent the accidental movement of a truck away from a loading dock during a loading operation. The conventional vehicle restraint includes a hook-like restraining member that can be moved from a storage position to an operative position where the hook extends outwardly from the loading dock and the tip of the hook will be in a position to be engaged by the ICC bar of the truck to prevent the truck from moving away from the dock.

The ICC bar is a horizontal bar or beam, located beneath the rear end of the truck bed to prevent underriding of the truck by an automobile in the event of a rear end collision. All trailer-type trucks, as well as city delivery trucks, are required to have an ICC bar, but the height of the bar above the ground, as well as the position of the ICC bar from the rear end of the truck bed can vary substantially from truck-to-truck.

It has been found that when the hook-like restraining member is in its operative position the outer tip of the hook may be spaced a substantial horizontal distance outwardly of the ICC bar and this is particularly true where the ICC bar is located immediately adjacent the rear end of the truck. If the tip of the hook is spaced outwardly from the ICC bar, the truck can rock in a fore and aft direction during a loading operation as material handling equipment, such as a fork lift truck, moves between the dock and the truck bed. This rocking action can cause undue stress on the restraining member and the ICC bar and in certain extreme situations, forward rocking of the truck can cause the lip of a dockboard, which bridges the gap between the loading dock and the truck bed, to fall out of engagement with the truck bed. Because of this, there has been a need for a vehicle restraint, in which the outer tip of the hook can be brought into tight engagement with the ICC bar during a loading operation to prevent fore and aft rocking of the truck.

Another consideration in the design of a vehicle restraint is a provision to accommodate vertical float of the truck bed and ICC bar during a loading operation. As a fork lift truck moves onto the truck bed, and as cargo is applied to the truck bed, the truck bed and ICC bar will lower. Conversely, when cargo is removed from the truck bed, the truck bed and ICC bar will rise. Because of this vertical float of the ICC bar during a loading operation, a vehicle restraint must incorporate a mechanism which will accommodate the float, so as to maintain the hook or restraining member in engagement with the ICC bar at all times during the floating action.

SUMMARY OF THE INVENTION

The vehicle restraint includes a frame or supporting structure, that is mounted on the front face of the loading dock, and a carriage or slide is mounted for vertical movement on guide tracks attached to the frame, and carries a hook-like restraining member which is movable between a lower storage position and an upper operative position. In the operative position, the outer tip of the restraining member is positioned outwardly of the ICC bar on the truck to block outward movement of the truck from the dock.

In accordance with a feature of the invention the outer section or tip of the restraining member is mounted for sliding movement on the carriage in a direction toward and away from the dock. By moving the tip in a direction toward the dock by a hydraulic cylinder unit, the tip can be brought into tight engagement with the ICC bar to prevent fore and aft rocking of the truck during the loading operation. The hydraulic cylinder unit is designed so that the inward snubbing force exerted through the hook tip against the ICC bar is substantially less than the outward force exerted by the truck and required to move the cylinder in the opposite direction.

A further feature of the invention includes a unique mechanism for accommodating float of the ICC bar. The restraining member is moved between the storage and operating position by a hydraulic cylinder unit that is connected through a flexible member, such as a chain, to the restraining member. By extending and retracting the hydraulic cylinder unit, the restraining member can be raised and lowered. In addition, a resilient member, such as a gas spring, is operably connected to the chain at a location between the attachment of the chain to the hydraulic cylinder unit and the attachment of the chain to the restraining member.

During the loading operation, the hydraulic cylinder unit will be locked in position, but the gas spring will permit movement of the chain and the restraining member to accommodate vertical float of the ICC bar.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
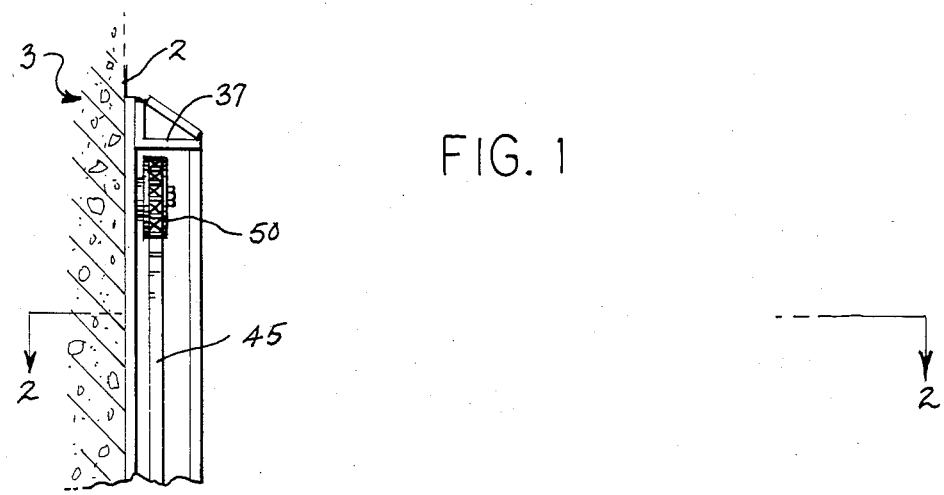
FIG. 1 is a side elevation, with parts broken away, of the vehicle restraint of the invention in the storage position.

The drawings show a vehicle or truck restraint 1 to be mounted on the front face 2 of a loading dock 3. A pair of bumpers 4 are mounted on front face 2 on either side of the vehicle restraint. As a truck backs toward the loading dock, the rear end of the truck bed will engage the bumpers 4 to space the truck bed outwardly from the dock.

Vehicle restraint 1 includes a frame or supporting structure 5, including a vertical mounting plate 6, which is mounted through suitable anchor bolts to front face 2 of dock 3. A pair of angle-shaped guide members 7 are mounted in spaced relation on plate 6 and a vehicle restraining means, indicated generally by 8, is mounted for vertical movement on guide members 7.

Restraining means includes an inner section or carriage 9 that is mounted for movement on guide members 7, and an outer section or tip 10, which extends upwardly from inner section 9 and is adapted to be moved relative to section 9 in a direction toward and away from dock 3.

Figure 2:
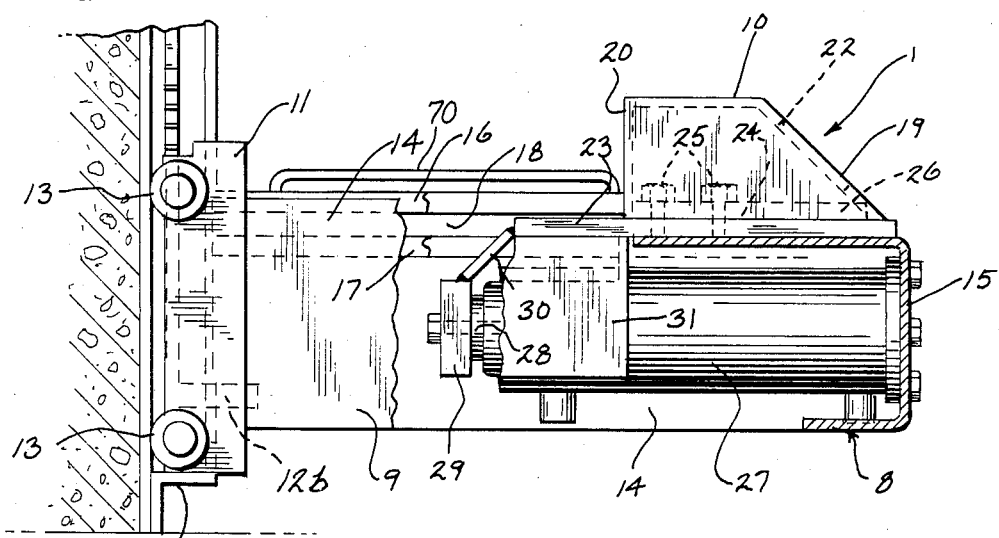
FIG. 2 is a top view of the vehicle restraint.
Figure 2:
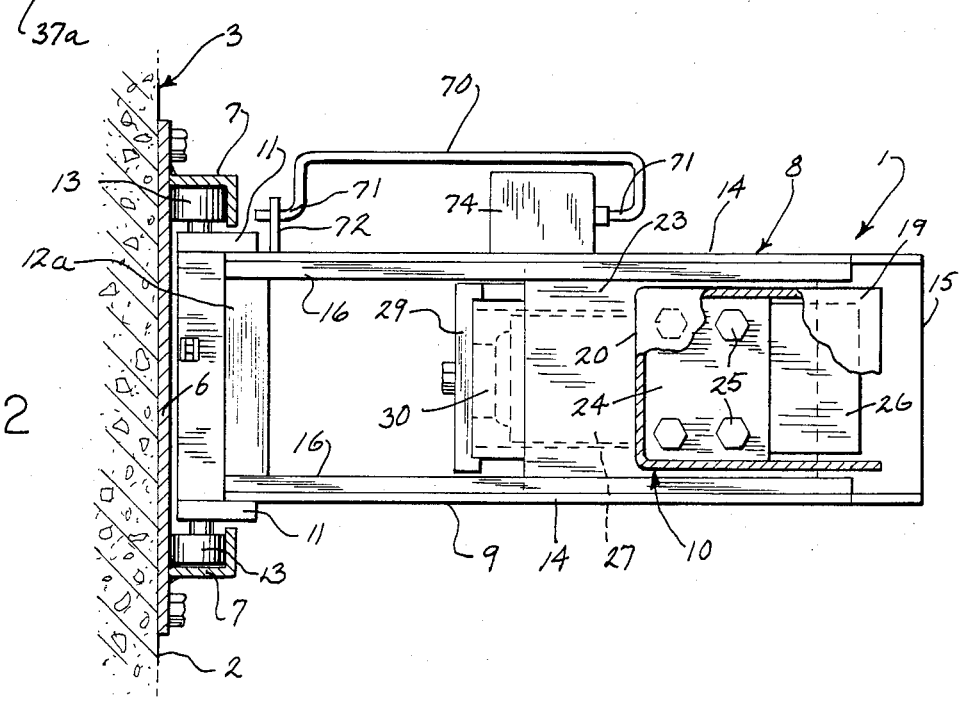

As best shown in FIG. 1 and 2, inner section 9 is composed of a pair of spaced vertical plates 11 which are connected by an upper cross bar 12a and a lower cross bar 12b. A pair of rollers 13 are mounted for rotation on each vertical plate 11 and are adapted to ride in the guide tracks 7 to enable the restraining means 8 to be moved from a lower storage position to an upper operating position.

In addition, inner section 9 includes a pair of vertical spaced side plates 14 which are joined at their outer ends by an end plate 15. Mounted on the inner surface of each side plate 14 are spaced guide bars 16 and 17 which define a horizontal guide track 18.

Outer section 10 of restraining means 8 includes an outer sloping surface 19 and an inner vertical surface 20, which is adapted to be moved into engagement with the ICC bar 21 of a truck. The ICC bar is mounted beneath the rear end of the truck bed and is designed to prevent the underriding of an automobile in the event of a rear end collision. The cross-sectional configuration of the ICC bar, the height of the ICC bar above the ground, and the spacing of the ICC bar from the end of the truck bed, can vary from truck to truck.

As shown in FIG. 1, outer surface 19 is formed with an access opening which can be enclosed by a plate 22.

Outer section 10 also includes a horizontal slide plate 23, which is mounted for sliding movement in tracks 18. Slide 23 is connected to base plate 24 by bolts 25. In addition, a shear plate 26 is welded to the upper surface of slide 23 and the abutting edges of plates 24 and 26 will take the outward thrust exerted by the ICC bar against the tip section 10 in the event the truck attempts to pull away from the loading dock during the loading operation.

To move outer section 10 in a direction toward and away from dock 3, a hydraulic cylinder 27 is positioned between the side plates 14 of inner section 9 and the rear end of the cylinder is connected to end plate 15. Piston rod 28, attached to a piston which is slidable in cylinder 27, is connected to a bar 29 which, in turn, is connected through angular plate 30 to the forward edge of slide 23. In addition, a pair of side plates 31, are located on either side of cylinder 27 and connect the plate 30, slide 23 and bar 29.

Figure 4:
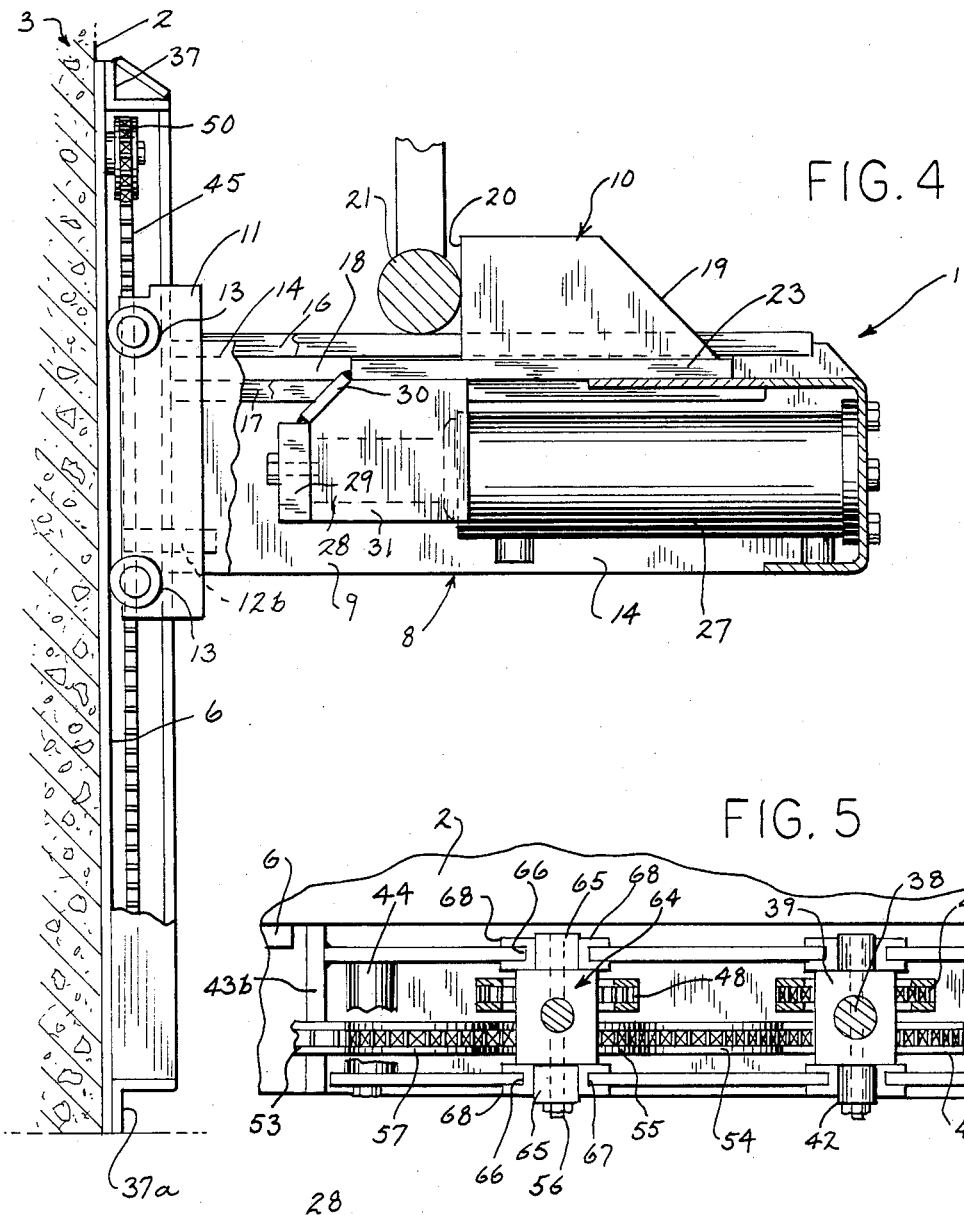
FIG. 4 is view similar to FIG. 1 and showing the vehicle restraint in the operating position with the tip snubbed against an ICC bar.

With the restraining means 8 in the upper operating position, the upper surface of section 9 will engage the ICC bar 21. Cylinder 27 is then operated to extend piston rod 28 and move outer section 10 inwardly toward the dock to bring surface 20 into engagement with the ICC bar, as shown in FIG. 4. The locked hydraulic system will then prevent fore and aft rocking of the ICC bar and truck during a loading operation and will eliminate any possibility of the truck moving forwardly to a position where the lip of a dockboard bridging the gap between the loading dock and truck bed would become disengaged from the truck bed.

Figure 3:
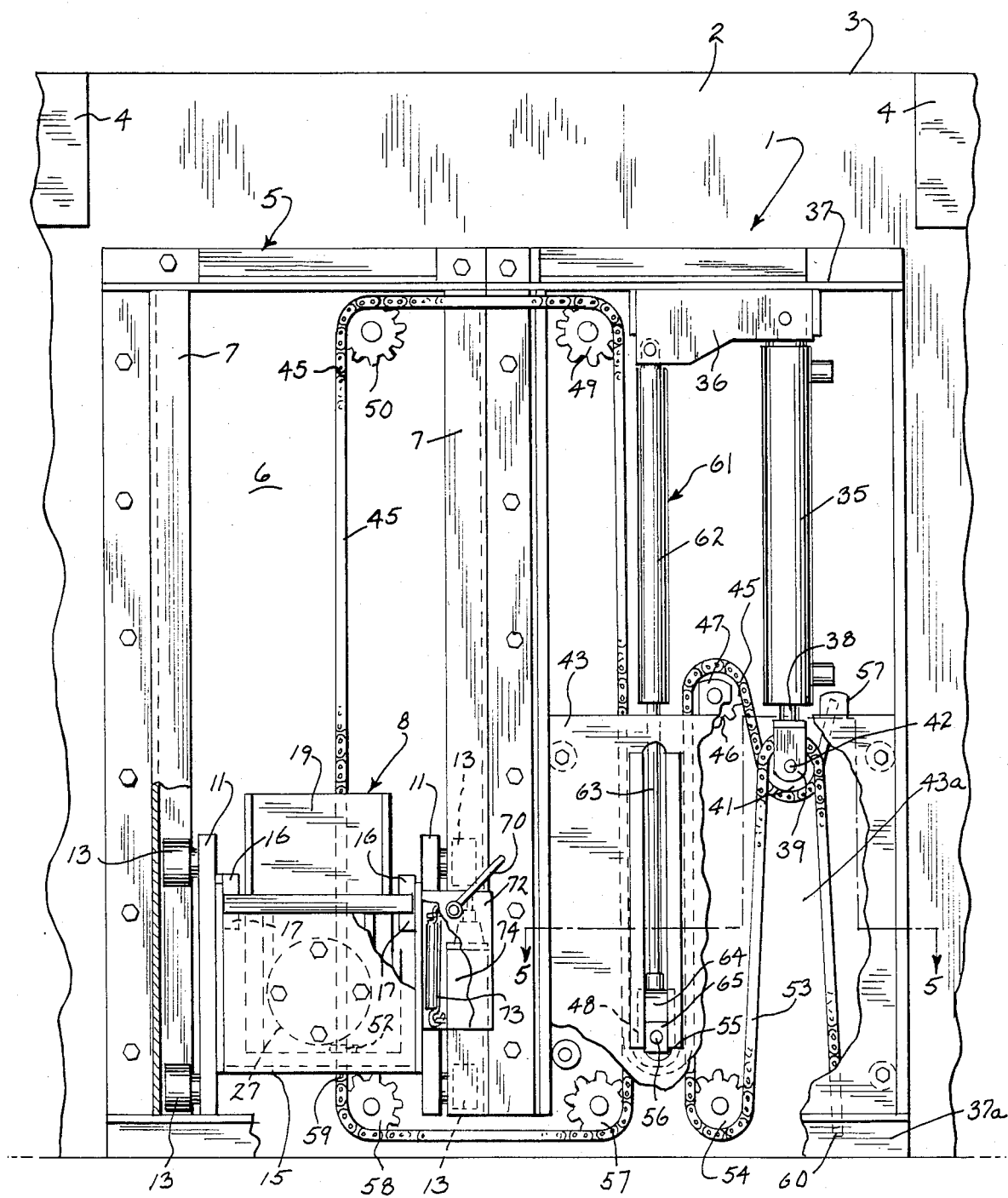
FIG. 3 is a front view of the vehicle restraint.
Figure 5:
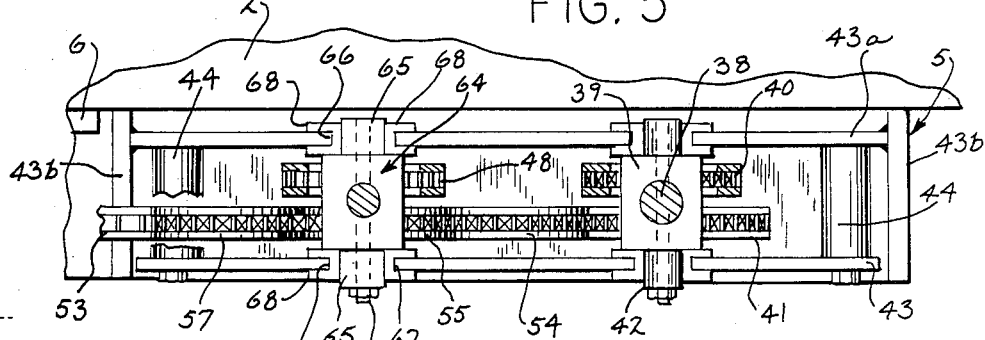
FIG. 5 is a section taken along line 5—5 of FIG. 3.

The invention also includes a novel mechanism for moving the restraining means 8 between the storage and operating positions and accommodating float of the ICC bar. As shown in FIG. 3, the upper end of a hydraulic cylinder 35 is connected to a plate 36, which extends downwardly from the upper angle 37 of frame 5. A piston rod 38 extends from the lower end of cylinder 35 and carries a clevis 39 which supports a pair of sprockets 40 and 41. Sprockets 40 and 41 are mounted for rotation on a shaft 42 that extends between parallel plates 43 and 43a, which are mounted in spaced relation to front face 2 of dock 3. Plates 43 and 43a are supported from dock face 2 by a pair of side plates 43b that extend vertically between angle 37 and a lower angle 37a. Plates 43 and 43a are spaced by a plurality of spacers 44, as best shown in FIG. 5.

A flexible connecting member, such as chain 45, is engaged with sprocket 40 and extends around an idler sprocket 46, which is mounted through bracket 47 to plate 43. In addition, chain 45 is engaged with sprockets 48, 49 and 50 and the end of chain 45 is connected to lower cross bar 12b by connector 52. The opposite end of chain 45 is dead-ended on frame 5, as indicated by 57 in FIG. 3.

With this drive arrangement, the extension of piston rod 38 will act through chain 45 to move the restraining means 8 upwardly to the operative position where the upper surface of section 9 will engage the ICC bar, as shown in FIG. 4.

As illustrated, the cylinder 35 is also employed to move the restraining means 8 downwardly to the storage position and in this regard, a second chain 53 is engaged with sprocket 41 and is also trained over sprockets 54 and 55. Sprocket 55 is mounted on a common shaft 56 with sprocket 48. In addition, chain 53 is engaged with a pair of sprockets 57 and 58 which are journalled on frame 5. One end of chain 53 is connected by a connector 59 to the inner section 9 of restraining means 8, while the opposite end of chain 53 is dead-ended on frame 5, as indicated by 60 in FIG. 3.

As piston rod 38 is retracted, the retraction of the piston rod will operate through chain 53 to move the restraining means 8 downwardly to the storage position.

To accommodate vertical float of the ICC bar, a resilient mechanism is incorporated with the drive chains 45 and 53. In this regard, a gas spring unit 61 is connected between the chains and frame 5. The gas spring unit 61 includes a cylinder 62 and a piston rod 63, which is slidable in cylinder 62, carries a clevis 64, mounted on shaft 65. Thus, extension and retraction of piston rod 63, will move sprockets 48 and 55 along with shaft 56 vertically.

Gas spring unit 61 is of conventional construction, in which the closed cylinder 62 contains a compressed gas, such as air or nitrogen. Opposite ends of the cylinder are connected, usually via an orifice through the piston, thus equalizing the pressure on both sides of the piston. However, the areas of the opposite faces of the piston on which the pressure acts are not equal due to the presence of the piston rod, so that a net force acting to extend the piston rod is created.

It is contemplated that other mechanisms can be employed to accommodate vertical float of the ICC bar during a loading operation. For example, an accumulator can be incorporated with the hydraulic cylinder 35, and the accumulator provides a compressible gas cushion over the reservoir of hydraulic fluid, or the hydraulic cylinder can be mounted through a resilient connection to the frame.

To guide the sprockets 48 and 55 in vertical movement, a pair of guide blocks 65 are mounted on opposite ends of shaft 56 and are slidable within slots 66 and 67 formed in plates 43 and 43a respectively. Generally U-shaped guide strips 68, formed of a material having a low coefficient of friction, such as nylon or the like, are mounted on the edges bordering the slots 66 and 67, as illustrated in FIG. 5. Sprockets 40 and 41 are guided for movement relative to plates 43 and 43a in a similar manner.

When the restraining means 8 is in the operative position, engaged with the ICC bar 21, the hydraulic cylinder 35 is locked in its fully extended position. Under these conditions, if the ICC bar should float downwardly, restraining means 8 will move downwardly with the ICC bar causing the chain 45 to retract the piston rod 63 of gas spring 61 to accommodate the downward float. Conversely, if the restraining means 8 floats upwardly, piston rod 63 of gas spring 61 will extend to correspondingly accommodate the upward float.

A sensing mechanism is incorporated in the vehicle restraint, as shown in FIGS. 2 and 3, which will act to operate cylinder 27 to bring the tip 10 into engagement with the ICC bar after the inner section 9 is moved upwardly into engagement with the ICC bar. In this regard, a sensor bar 70 is mounted for pivoting movement along the outer surface of one of the side plates 14. Sensor bar 70 is provided with a pair of bent ends 71 which are mounted for pivoting movement within brackets 72 extending outwardly from side plate 14. Sensor bar 70 is maintained in an upper position by a spring 73.

In its normal upwardly biased condition, sensor bar 70 extends above the level of the upper surface of inner section 9 of the restraining means 8. As the inner section 9 of restraining means 8 moves upwardly toward the ICC bar 21, the ICC bar will initially engage sensor bar 70, pivoting it downwardly to actuate limit switch 74 and thereby operate cylinder 27 to move outer section 10 into snubbing relation with the ICC bar, as shown in FIG. 4.

Figure 6:
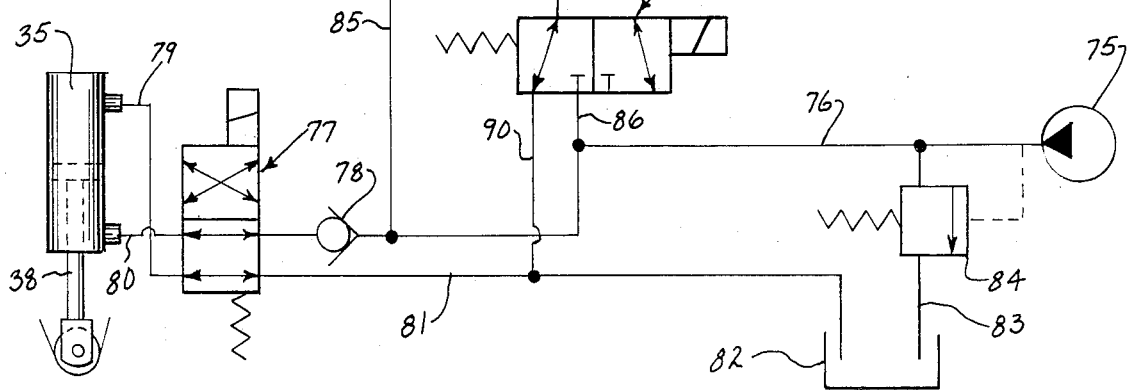
FIG. 6 is a schematic drawing of the hydraulic circuit.

The hydraulic system for operating cylinders 27 and 35 is illustrated schematically in FIG. 6. Pump 75 discharges hydraulic fluid under pressure through a pressure line 76, which is connected to a manually operated two-position solenoid valve 77. Check valve 78 is mounted in line 76. Lines 79 and 80 connect valve 77 to the opposite ends of cylinder 35, as illustrated in FIG. 6. In addition, a return line extends from valve 77 to reservoir 82 and the reservoir is connected to pump 75 through line 83. Pressure relief valve 84 is mounted in line 83.

Connected to pressure line 76 is line 85, which communicates with an end of the cylinder 27 that operates outer tip section 10, and a second line 86 is connected between pressure line 76 and a solenoid operated two-position valve 87. Line 88 is connected between valve 87 and the opposite end of cylinder 27 and check valve 89 is located in line 88. In addition, line 90 connects valve 87 with return line 81 and pilot line 91 is connected between line 85 and check valve 89.

In operation, a truck backs toward the loading dock 3 and the rear end of the truck bed will engage the bumpers 4, mounted on either side of the vehicle restraint. The operator standing on the dock will then, through suitable controls, start operation of pump 75 and energize valve 77, causing pressurized fluid to flow through line 76 and valve 77 to cylinder 35 to extend the piston rod and lift the restraining means 8 into engagement with the ICC bar and cylinder 35 will be locked in this position by check valve 78. At this tie, pressurized fluid is also distributed through line 85 to cylinder 27 to maintain the tip section 10 in its outermost position.

As the restraining means 8 rises, ICC bar 21 will engage sensor bar 70, actuating the limit switch 74 to operate valve 87 and cause pressurized fluid to be distributed through line 88 and line 85 to both ends of cylinder 27 to move the outer section 10 inwardly into snubbing engagement with the ICC bar 21, as shown in FIG. 4.

After the loading operation has been completed, valve 87 is operated by a suitable pushbutton to close off line 86 and fluid is introduced through line 85 to the piston rod end of the cylinder 27 to move the tip section 10 to the release position. Once tip section 10 has reached its outermost position, valve 77 is actuated to introduce fluid through line 80 to the cylinder 35 to retract the cylinder and move the restraining means 8 downwardly to the storage position.

When the member 10 is moved inwardly toward the dock to provide the snubbing action against the ICC bar, as shown in FIG. 4, the snubbing force will be equal to the pressure of the hydraulic fluid in cylinder 27, times the exposed area of the piston. However, if the truck attempts to pull away from the dock, the ICC bar will exert a force against member 10 which will act in a direction to retract piston rod 28 and move the piston in cylinder 27 to the right, as viewed in FIG. 4. This force will be countered by the reactive force exerted by the hydraulic fluid against the exposed face of the piston. This reactive force to oppose outward movement will be substantially greater than the snubbing force, due to the difference in exposed area on opposite faces of the piston and due to the presence of check valve 89. This results in a condition where the hydraulic cylinder unit will enable the restraining member to effectively withstand a large pull-out force exerted by the truck, yet, with the same pressure, will apply a lesser snubbing force to prevent possible deformation of the ICC bar.

While the drawings have illustrated an operating system in which the restraining means 8 is power driven both up and down, it is contemplated that in certain installations the restraining means can be power driven to the upper position and will return to the lower position by gravity, or alternately, the restraining means can be biased up to the operative position and power driven down to the lower storage position.

Various modes of carrying out the invention are contemplated as being within the scope of the following claims particularly pointing out and distinctly claiming the subject matter which is regarded as the invention.

I claim:

1. A vehicle restraint, comprising a frame to be mounted on a loading dock, restraining means mounted for movement on the frame from a storage position to an operative position where said restraining means will be disposed in a position outward of an abutment on a vehicle parked in front of the loading dock to prevent the vehicle from moving away from said dock, a flexible member interconnecting said restraining means and said frame, hydraulic cylinder means operably interconnecting the frame and said flexible member at a location intermediate the ends of said flexible member, and resilient means operably connected to the flexible member and constructed and arranged to permit limited vertical movement of said restraining means when said restraining means is in the operative position and said hydraulic cylinder means is in a locked condition.

2. The vehicle restraint of claim 1, wherein said flexible member comprises a chain.

3. The vehicle restraint of claim 1, wherein said resilient means is connected to said chain at a location between the attachment of said hydraulic cylinder means to said chain and the attachment of said restraining means to said chain.

4. A vehicle restraint for preventing accidental movement of a vehicle away from a loading dock during a loading operation, comprising a supporting structure mounted on said dock, restraining means mounted for movement on said structure between a storage position and an operating position wherein said restraining means prevents movement of said vehicle away from said dock, hydraulic cylinder means including a piston member and a cylinder member with a first of said members being movable relative to a second of said members, a flexible element connected to said restraining means, said first member of said hydraulic cylinder means being connected to said flexible element in a manner so that movement of said first member relative to said second member will cause movement of said restraining means between the storage position and the operating position, and resilient means operably connected to said flexible element at a location between the attachment of said flexible element to said first member and the attachment of said flexible element to said restraining means, said resilient means being constructed and arranged to permit limited vertical movement of said restraining means caused by vertical movement of said vehicle during said loading operation and when said first member is locked in position relative to said second member.

5. The vehicle restraint of claim 4, wherein said resilient means comprises a gas spring unit.

6. The vehicle restraint of claim 4, wherein said supporting structure includes guide means mounted on said dock, said restraining means comprises a carriage mounted for movement on said guide means and a hook extending upwardly from the outer end of said carriage.

7. A vehicle restraint for preventing accidental movement of a vehicle away from a loading dock during a loading operation, comprising a frame, restraining means mounted for movement on said frame between a storage position and an operative position, said restraining means having a first section that extends outwardly from said frame when said restraining means is in the operative position and disposed to engage an abutment on said vehicle as said restraining means moves to said operative position, said restraining means also having a second section extending generally vertically from the outer end of said first section and disposed outwardly of said abutment when said restraining means is in the operative position, said second section being mounted for movement relative to said first section in a direction toward and away from said frame, and operating means for moving said second section in a direction toward said frame when said restraining means is in the operative position to move said second section into snubbing engagement with said abutment.

8. The vehicle restraint of claim 7, wherein said second section is mounted for linear sliding movement with respect to said first section.

9. The vehicle restraint of claim 7, wherein said operating means comprises a hydraulic cylinder unit carried, by said first section.

10. The vehicle restraint of claim 7, wherein said second section extends upwardly from the upper surface of said first section.

11. The vehicle restraint of claim 7, wherein said frame includes guide means mounted on a vertical face of said dock, said first section being mounted for vertical movement on said guide means.

12. The vehicle restraint of claim 9, wherein said hydraulic cylinder unit is constructed and arranged so that the force exerted by said hydraulic cylinder unit in moving said second section in a direction toward said frame is substantially less than the reactive force in said unit opposing a force exerted through said abutment against said second section and necessary to move said second section in the opposite direction.

13. A vehicle restraint for preventing accidental movement of a vehicle away from a loading dock during a loading operation, comprising a supporting structure, restraining means mounted for movement on said supporting structure between an inoperative position and an operative position, said restraining means having a first section that extends outwardly from said structure and is engaged with an abutment on a vehicle when said restraining means is in the operative position and having a second section extending generally vertically from the outer end o said first section and is located outwardly of said abutment when said restraining means is in the operative position to prevent the vehicle from moving away from said dock, said second section being mounted for movement relative to said first section in a direction toward and away from said structure, and a hydraulic cylinder unit for moving said second section in a direction toward said structure to move said second section into snubbing engagement with said abutment, said hydraulic cylinder unit is constructed and arranged so that the force exerted by said hydraulic cylinder unit in moving said second section in a direction toward said structure is substantially less than the reactive force in said unit opposing a force exerted through said abutment against said second section and necessary to move said second section in the opposite direction.

14. A restraint for preventing accidental movement of a truck away from a loading dock during a loading operation, comprising a frame, restraining means mounted for movement on said frame between a storage position and an operative position where said restraining means is engaged with an abutment on said truck and prevents outward movement of said truck from said dock, said restraining means having a first section extending outwardly from said dock when said restraining means is in the operative position and having a second section extending generally vertically from the outer end of said first section when said restraining means is in the operative position, said second section being mounted for movement relative to said first section in a direction toward and away from said dock, operating means for moving said second section relative to said first section in a direction toward said dock, and means operable as a consequence of said restraining means being moved to the operative position for actuating said operating means.

15. The restraint of claim 14, and including guide means for guiding said second section for linear sliding movement with respect to said first section.

16. The restraint of claim 14, wherein said means operable as a consequence of said restraining means being moved to the operative position comprises sensing means carried by said restraining means and disposed to engage said abutment as said restraining means is moved to the operative position.

17. The restraint of claim 16, wherein said sensing means is mounted on said first section of said restraining means.

18. The restraint of claim 17, wherein said sensing means is located above the level of the upper surface of said first section.

* * * * *

UNITED STATES PATENT AND TRADEMARK OFFICE
CERTIFICATE OF CORRECTION

PATENT NO. : 4,815,918
DATED : March 28, 1989
INVENTOR(S) : MARK A. BENNETT ET AL It is certified that error appears in the above-identified patent and that said Letters Patent is hereby corrected as shown below:

Col. 7, line 60, CLAIM 9, After "carried" delete "," (comma);
Col. 8, Line 17, CLAIM 13, Cancel "o" and substitute therefor ---of---

Signed and Sealed this

Twenty-sixth Day of December, 1989

Attest:

JEFFREY M. SAMUELS

Attesting Officer  Acting Commissioner of Patents and Trademarks